United States Patent [19]
Hendrickson

[11] 4,121,771
[45] Oct. 24, 1978

[54] DRIP IRRIGATION EMITTER

[76] Inventor: Ralph L. Hendrickson, 3649 Noble Ave., North, Robbinsdale, Minn. 55422

[21] Appl. No.: 759,646

[22] Filed: Jan. 17, 1977

[51] Int. Cl.² .............................................. B05B 1/30
[52] U.S. Cl. ..................................... 239/272; 137/42; 239/542; 239/590.3
[58] Field of Search ............................. 239/107–109, 239/115, 272, 542, 104, 106, 555.3, 590.3; 138/37, 40–46

[56] References Cited

U.S. PATENT DOCUMENTS

| 3,863,845 | 2/1975 | Bumpstead | 239/542 |
| 3,891,150 | 6/1975 | Hoff et al. | 239/272 |
| 3,968,930 | 7/1976 | Hendrickson | 239/107 |

Primary Examiner—John J. Love
Assistant Examiner—Andres Kashnikow
Attorney, Agent, or Firm—Nickolas E. Westman

[57] ABSTRACT

A drip irrigation emitter or device comprising a flow restrictor helical thread on the outside of a main body, and a cap member that fits over the thread. Water is supplied to the interior of the main body and must flow through a narrow, annular passageway formed by the cap before the water flows through provided restrictor orifices, so no large particles are carried into the orifices or the helical thread to minimize plugging. The water discharges adjacent to the water tube or hose to minimize root intrusion into the irrigation device, and baffles also are provided to minimize root intrusion. The cap can be loosened or removed to flush the thread if foreign material enters the thread.

10 Claims, 5 Drawing Figures

DRIP IRRIGATION EMITTER

BACKGROUND OF THE INVENTION

1. Field of the Invention

The present invention relates to drip irrigation flow restrictor devices.

2. Prior Art

In the prior art, my own U.S. Pat. No. 3,968,930 shows a drip irrigation device which is coupled to two sections of a hose for axial flow, with a flow restrictor thread on the outside of the coupling. The device permits flushing the flow restrictor threads without disconnecting the two hose sections. This device works well in many installations. Other known flow restrictor devices are exemplified by the patents cited in my U.S. Pat. No. 3,968,930.

SUMMARY OF THE INVENTION

The present invention relates to a drip irrigation device comprising a housing that attaches at one end to a hose carrying water. In one form the hose can be pierced with a suitable attachment member. The housing forms an interior chamber into which water will flow. A thread is formed on the exterior of this housing, and a suitable cap is provided over the housing and thread. Also, the cap has a sleeve that extends into the interior chamber adjacent the end opposite from the water inlet. The water, in order to exit from the housing, must flow between the inner surface of the chamber and the outer surface of the cap sleeve to orifices located in the wall of the housing, and then flow back through the exterior thread, back adjacent to the water inlet.

The sleeve, which is concentric with the housing, is closely spaced from the wall of the chamber to form an initial flow restrictor to keep any foreign material from plugging the orifices and the helical thread. The housing also has annular baffles adjacent the end where the water exits that will restrict and tend to prevent root growth into the helical thread, which has been a problem in the past.

The thread may be flushed clean by unthreading the cap, and partially removing it from the housing. The sleeve that forms a flow restrictor may be pulled back to a position where it will permit water to be directly discharged through the orifices which lead to the helical thread and also may be pulled back sufficiently far so that flushing action of the entire thread can be achieved without complete removal of the cap.

The device is relatively simple to mold, and easy to install. It further gives the advantages of having a flushing action for cleaning the helical threads, and provides means for tending to insure that there will be no large amounts of foreign material entering the helical thread to cause plugging.

Additionally, when the unit is oriented with the outlet orifices along a diametral, horizontal plane, any silt or heavy foreign material carried by the water, will tend to settle out on the interior of the housing below the orifices. Thus any silt that is settling out does not tend to plug the orifices leading to the helical thread.

DESCRIPTION OF THE PREFERRED EMBODIMENTS

Figure 2:
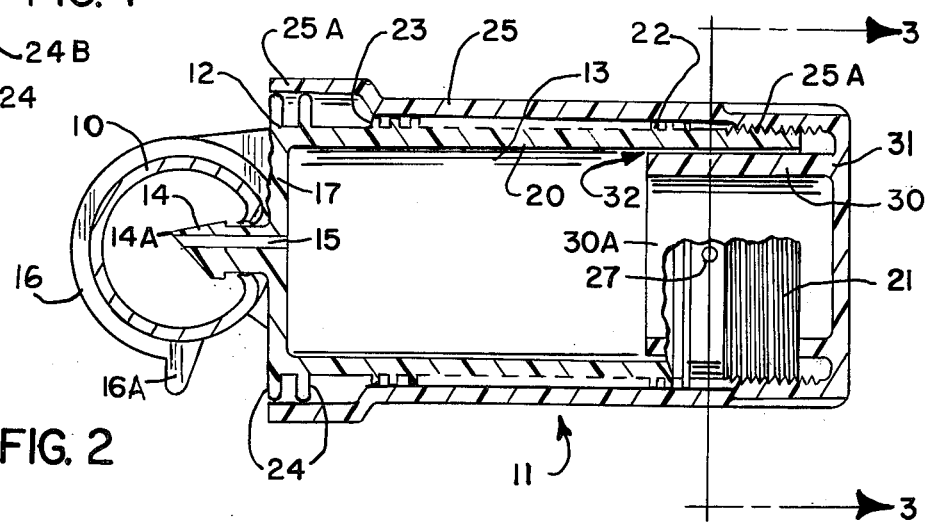
FIG. 2 is a sectional view taken as on line 2—2 in FIG. 1, with one portion broken away to illustrate an inlet hole to the helical thread.

A typical water carrying hose illustrated at 10 is connected to a supply of irrigation water (not shown) and the water flows axially through the hose. The drip irrigation device illustrated at 11, which is made according to the first form of the present invention is installed on the hose 10. In this particular installation, the drip irrigation device is a molded plastic unit that has a main body portion 12, with a hollow interior cylindrical cavity or chamber 13, and at one end of the body 12 a sharpened lead in member 14 is formed. The member as shown has a sharpened edge 14A, and is tapered generally into an arrowhead shape. This member is forced through a prepunched hole through the side wall of the hose 10, as shown in FIG. 2, so that an inlet passageway indicated at 15 is open to the interior of the hose and to the chamber 13. An exterior flexible retaining strap 16 will fit partially around the hose and hold the drip irrigation device 11 to the hose.

Water pressure on the interior of hose 10 will tend to seal the edges of the hose against the member 14 and against an end wall 17 of the body member 12. The strap 16 as shown has a free end 16A that can be lifted away from the body member to permit the member 14 to be pushed through the provided hole in the wall of the tube.

The body 12 shown has a cylindrical peripheral wall 20 defining the cavity 13, and at its outer end, that is the end farthest from the tube or hose 10, there is an external helical cover fastening thread 21. A flow restrictor helical rib forming a type of thread and indicated at 22 extends from location spaced from the inner end of the cover fastening thread 21 to an exit position 23 which is spaced from the end of the housing 12 that is adjacent to the hose 10. The helical flow restriction rib or thread may be similar or identical in pitch and size to that shown in my U.S. Pat. No. 3,968,930 so the entire length is not shown for sake of clarity. The ribs or threads 22 extend continuously and helically from adjacent to thread 21 to the outlet end 23, and a flow restrictor passageway is defined between the ribs or threads 22. A cap or cover 25 is positioned over body member 12.

A pair of axially spaced annular baffles or flanges 24 are provided adjacent the hose member 10, as shown, on the exterior of the body 12. The baffles 24 are each provided with one notch 24A and 24B, respectively, (see FIG. 1). The notches are 180° apart and are centered on a diametral horizontal plane so they are above the ground when the irrigation device is resting on the ground. Any water exiting the flow restrictor thread 22 at position 23 will drip out from notch 24A defined in the innermost baffle 24, and then out notch 24B in the outer baffle. The edges of baffles or flanges 24 fit tightly against the inner surface of the offset portion 25A of cap 25. The baffles thus form chambers in cooperation with the offset portion 25A that would partially fill with water until the water started to exit from the respective notches 24A and 24B.

Cap member 25 also has a tapered inner surface (getting smaller in direction away from hose 10) and the mating outer surfaces of the ribs or threads 22 forming the flow restrictor passage also have a mating taper. Thus the inner surface of the cap seats against the outwardly facing edge surfaces of the ribs.

Figure 1:
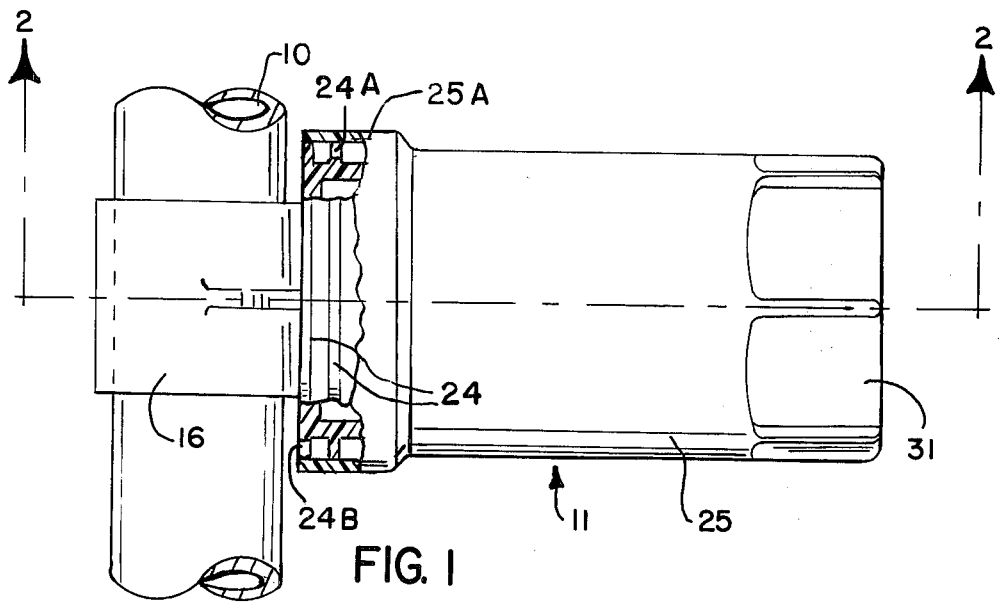
FIG. 1 is a top plan view of a flow restrictor device made according to a first form of the present invention and shown installed on an irrigation hose.

The water outlets, comprising notches 24A and 24B are off the ground and close to hose 10, as shown in FIG. 1. The hose 10 tends to shield the outlets to minimize weed or root intrusion. The baffles 24 also shield the flow restrictor passageway formed by rib or thread 22 from foreign materials.

Figure 3:
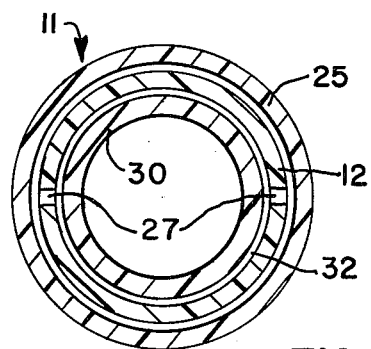
FIG. 3 is a sectional view taken as on line 3—3 in FIG. 2.
Figure 5:
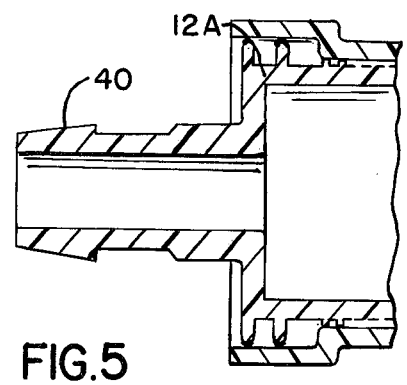
FIG. 5 is a fragmentary sectional view showing a modified form of hose attachment.

Between the inner end of the fastening threads 21 and the start of the helical ribs or thread 22, as shown in FIG. 2, a pair of orifices 27 are provided through the peripheral wall 20. The orifices 27 open from the interior cavity 13 formed by the housing wall 20 the the space at the starting end of the helical flow restrictor thread 22. It can be seen in FIG. 3 that orifices 27 are positioned above the bottom edge of the interior cavity 13, that is, they are on a diametral horizontal plane, when the hose member 10 is lying along the ground just as notches 24A and 24B are positioned on such a plane.

The cap 25, as shown in FIG. 2 has a cylindrical sleeve 30 molded to an end wall 31, and the sleeve 30 is of size to fit closely within the interior surface forming the cavity 13 at the open end of the housing 12. The sleeve is closely spaced with respect to the interior surface, so that the water on the interior of the cavity 13 must pass between the interior surface forming the cavity 13 and the exterior surface of the sleeve 30 in order to flow through the orifices 27. This inlet space is indicated at 32. Because both the sleeve 30 and the cavity wall 20 are generally cylindrical, this space is annular around the outside of the surface of the sleeve 30. The end wall 31 blocks water from flowing axially out of the cavity 13, and thus the water is forced to go through the orifices 27 and enter the flow restrictor channel formed by adjacent portions of the rib or thread 22 and flow to end 23 where the water will then move through notch 24A and drip slowly out the notch 24B which is formed in the outermost baffle 24, and onto the ground for irrigation.

It should be noted that in this arrangement the baffles 24 will tend to prevent roots or the like from entering into the passage formed by the flow restrictor thread 22. The exit of the water through notch 24B is adjacent to the tube 10, and the tube partially shields root growth and foreign material from the exit notches 24A and 24B in the baffles 24.

The unit can be easily cleaned or flushed by unthreading the cover member 25 so that the threaded portion 25A of the cover is released from the fastening threads 21, and the inner end 30A of the sleeve 30 can be pulled axially out of body 12 away from the hose or tube 10 to a position where this inner edge 30A is out beyond the orifices 27. Water can flow through the orifices 27 directly from the interior chamber 13 under full pressure. The outer surface of the ribs or thread 22 on the body member 12 is tapered slightly (smaller in direction away from hose 10), and the inner surface of the cap or housing 25 which surrounds the flow channel formed by ribs 22 also is tapered at the same taper angle, so that the space between the cap or cover 25 and the outer surface of the ribs or thread 22 increases as the cap is moved away from the hose 10. The taper may permit water to flush the flow restrictor channel or thread 22 more easily. The entire cap or cover 25 can be pulled far enough out so that the edge 30A clears the outer end of the body 12 and then water will flow around the outer end of the body 12 and up on the exterior of the housing to flush the threads more fully.

This action permits easy cleaning. The orifices are up out of the way of silt that settles in the interior of the chamber 13. The space 32 provides an initial restriction to restrict the size of the particles of foreign material that pass to the orifices 27 so they are smaller than the size of the orifices. By having a preliminary restriction, plugging of both the orifices and the helical flow restrictor thread is minimized. This increases the length of time that the flow restrictor can operate without cleaning or flushing. When the flow restrictor is to be flushed, it is a very simple job to unthread the cap 25, and let the water flow either directly through the orifices 27 into the helical threads 22 for flushing, or to remove the cap and work it back and forth axially to insure that water flowing out through the end of the housing 12 will be forced over the threads freely to flush completely. Further, manual cleaning can be accomplished when the cap 25 is taken off.

The tapered outer surface of the ribs 22 and the mating taper on the inner surface of cap 25 also permit adjustment of the fit of the cover relative to the threads. As plastic ages it may shrink and if the outer surfaces of ribs 22 become spaced from the cap 25, the cap can be tightened down onto the ribs 22 by tightening fastening threads 21 and 25A to move the cap toward the hose 10. Because of the tapered surfaces the cap tightens down.

Figure 4:
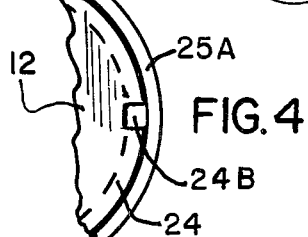
FIG. 4 is a fragmentary end view of the device of FIG. 1.

In FIG. 4 the interior body 12A has an inline connector 40 over which a hose can be slipped. The drip irrigation device thus will be at the end of a hose. The unit will operate in exactly the same manner as described in connection with FIGS. 1–3. FIG. 4 is merely to show an alternate hose connection at the end of a hose.

What is claimed is:

1. A device for providing a restricted flow of a liquid from a conduit carrying said liquid comprising a body member, means to attach said body member to a conduit, said body member comprising a peripheral wall defining an interior cavity open to a conduit attached to the means to attach, means defining a restricted flow path on the exterior of said peripheral wall, an orifice through said peripheral wall leading from the interior cavity to said restricted flow path, said orifice being spaced from the means to attach whereby liquid passing from the conduit to the orifice flows through portions of said cavity, said restricted flow path defining a liquid outlet adjacent to said means to attach, a cover member adapted to be mounted on the exterior of said peripheral wall in position covering said orifice and said restricted flow path to force liquid passing through said orifice to flow through said flow path from the orifice to the liquid outlet, and means positioned on the interior of said peripheral wall defining a particle restriction passage between the cavity and said orifice to limit the size of particles that are carried by flow from the conduit to the orifice to particles which are smaller than the size of the orifice.

2. The combination of claim 1 wherein said means positioned on the interior comprises a sleeve carried by said cover member extending into said interior cavity and being closely spaced from the interior of said peripheral wall and forming a restricted substantially annular passageway to restrict the size of particles reaching said orifice.

3. The combination of claim 1 wherein said peripheral wall is cylindrical and said interior cavity is cylindrical and has an open end opposite from the means to attach the body member to a conduit, said cover member comprising a cylindrical cover having one open end and an end wall which closes the open end of the cavity, said means defining a restricted flow path including wall members defining an outwardly open channel, said cover member encircling the outwardly open channel when in place on the body member.

4. The combination of claim 3 wherein said orifice is adjacent the open end of the cavity, said means positioned on the interior comprising a sleeve member mounted on said cover member and protruding into said cavity from said open end to position beyond said orifice in direction toward said means to attach, said sleeve being spaced from the interior surface of said peripheral wall to form a restricted passageway for liquid flow from the means to attach to the orifice to comprise said particle restriction passage.

5. The combination of claim 4 wherein said cover member is longer than said sleeve in longitudinal axial direction and threadable means engageable between said body member and said cover member to releasably retain said cover member on said body member.

6. A device for providing a restricted flow of a liquid from a conduit carrying said liquid comprising a body member, means to attach said body member to a liquid carrying conduit, said body member having a peripheral wall forming an interior cavity which is open to a conduit attached to the means to attach, means defining a restricted flow path on the exterior of said peripheral wall, an orifice leading from the interior cavity through said peripheral wall to said restricted flow path, said orifice being positioned at a location spaced from said means to attach, said restricted flow path defining a liquid outlet adjacent to said means to attach, a pair of axially spaced annular baffle means on the body member in position spaced toward the means to attach from said liquid outlet, and a cover member covering said orifice and said restricted flow path to force liquid passing through said orifice to flow through said flow path from the orifice to the liquid outlet, said cover member having a portion fitting closely over and encircling both of said baffle means so that said baffle means shields the liquid outlet, and each of said baffle means having an outlet notch defined therein offset annularly from the notch in the other of the baffle means.

7. A drip irrigation device for providing a restricted flow of a liquid from a hose carrying said liquid comprising a body member having an interior cavity formed by a wall and comprising one open end and a closed end, connection means permit water to be introduced into said cavity, a rib formed on the exterior of said body member to define a flow restrictor channel, orifice means in said wall leading from the interior cavity to the channel through a wall of said body member, said orifice means being positioned adjacent said open end, said channel extending from adjacent said orifice means to adjacent said closed end, a cover member covering said open end to force water passing through said orifice means to flow through said channel, means carried by said cover member comprising a sleeve that fits through the open end of said cavity beyond said orifice means and is spaced from the wall forming the cavity to provide a passageway which limits the size of particles which may enter the orifice means from said cavity to particles smaller than said orifice means.

8. The drip irrigation device of claim 7 wherein said orifice means comprises a pair of orifices each having an axis on a common horizontal plane passing through the central axis of said body member.

9. The drip irrigation device of claim 7 wherein said connecting means comprises a tubular member mounted on the end of said body member opposite from said open end, said tubular member being adapted to fit within a water hose.

10. The drip irrigation device of claim 9 wherein said tubular member has an end formed to pass through a wall of a water hose, and a band adapted to at least partially encircle a hose used with the drip irrigation device when the tubular member extends through the wall of the water hose.

* * * * *